US011327530B2

(12) United States Patent
Gabbay

(10) Patent No.: US 11,327,530 B2
(45) Date of Patent: May 10, 2022

(54) MOBILE COMPUTER

(71) Applicant: Moshe Gabbay, Bney-Brak (IL)

(72) Inventor: Moshe Gabbay, Bney-Brak (IL)

( * ) Notice: Subject to any disclaimer, the term of this patent is extended or adjusted under 35 U.S.C. 154(b) by 0 days.

(21) Appl. No.: 17/369,986

(22) Filed: Jul. 8, 2021

(65) Prior Publication Data

US 2021/0333830 A1 Oct. 28, 2021

Related U.S. Application Data

(63) Continuation-in-part of application No. PCT/IL2020/051281, filed on Dec. 13, 2020.

(60) Provisional application No. 62/975,212, filed on Feb. 12, 2020.

(51) Int. Cl.
*G06F 1/16* (2006.01)

(52) U.S. Cl.
CPC ............ *G06F 1/1639* (2013.01); *G06F 1/162* (2013.01); *G06F 1/1632* (2013.01); *G06F 1/1681* (2013.01)

(58) Field of Classification Search
CPC ...... G06F 1/1639; G06F 1/1681; G06F 1/162; G06F 1/1632
See application file for complete search history.

(56) References Cited

U.S. PATENT DOCUMENTS

| 6,028,649 A | * | 2/2000 | Faris | G02B 27/0093 |
| | | | | 349/10 |
| 6,626,543 B2 | | 9/2003 | Derryberry | |
| 2011/0267382 A1 | * | 11/2011 | Fergason | G02F 1/1336 |
| | | | | 345/690 |

FOREIGN PATENT DOCUMENTS

| CN | 203386118 U | 1/2014 |
| KR | 20180134223 A | 12/2018 |

* cited by examiner

*Primary Examiner* — Rockshana D Chowdhury
(74) *Attorney, Agent, or Firm* — Patshegen IP LLC; Moshe Pinchas

(57) ABSTRACT

A mobile computer including a liquid crystal display, a first illumination source, a second illumination source for illuminating through a portion, and a lens.

5 Claims, 6 Drawing Sheets

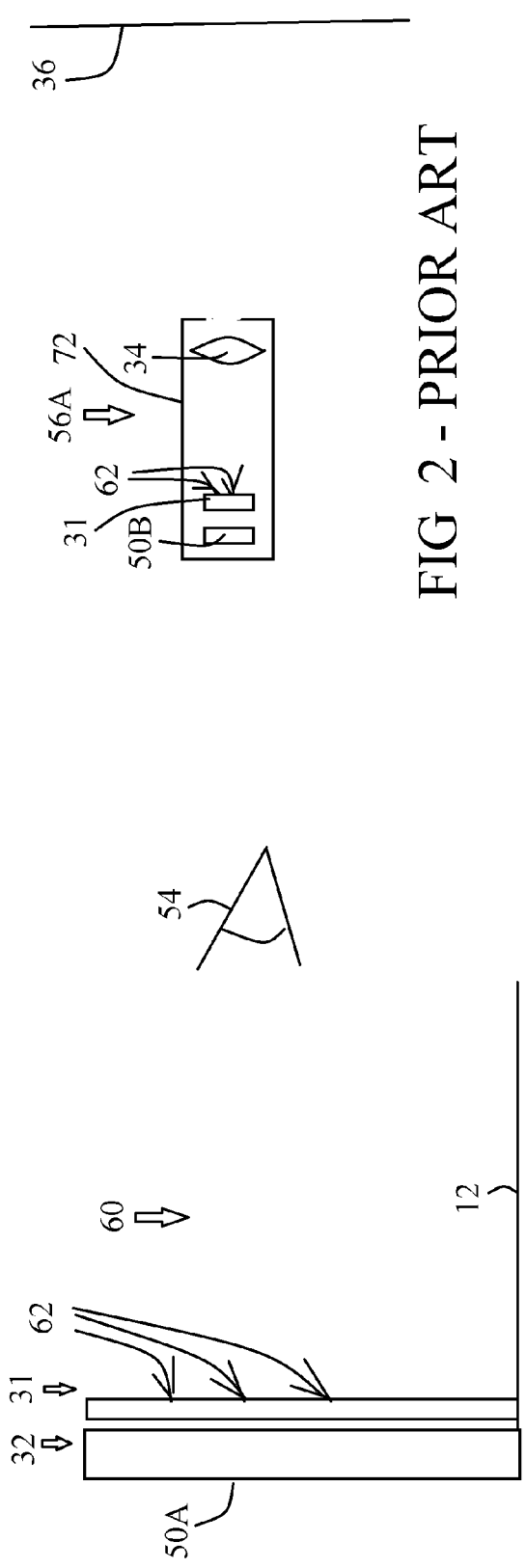
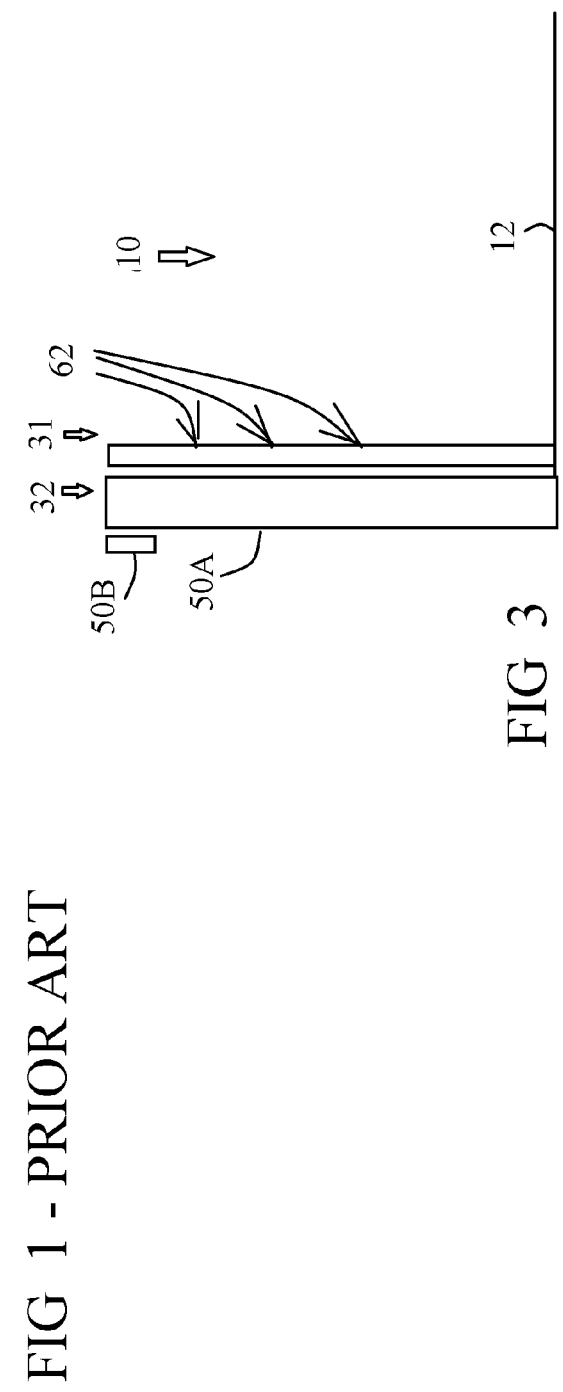
FIG 1 - PRIOR ART
FIG 2 - PRIOR ART
FIG 3

MOBILE COMPUTER

TECHNICAL FIELD

The invention relates to the field of mobile computers.

BACKGROUND

The monitor of a prior art mobile computer provides personal display only.

There is a long felt need to provide public display by a mobile computer.

SUMMARY

A mobile computer is provided, including a liquid crystal display, a first illumination source, a second illumination source, for illuminating through a portion, and a lens.

BRIEF DESCRIPTION OF THE DRAWINGS

FIG. 1 depicts a prior art mobile computer.

FIG. 2 depicts a prior art projector.

FIG. 3 depicts a mobile computer according to one embodiment of the invention.

DETAILED DESCRIPTION

Figure 4:
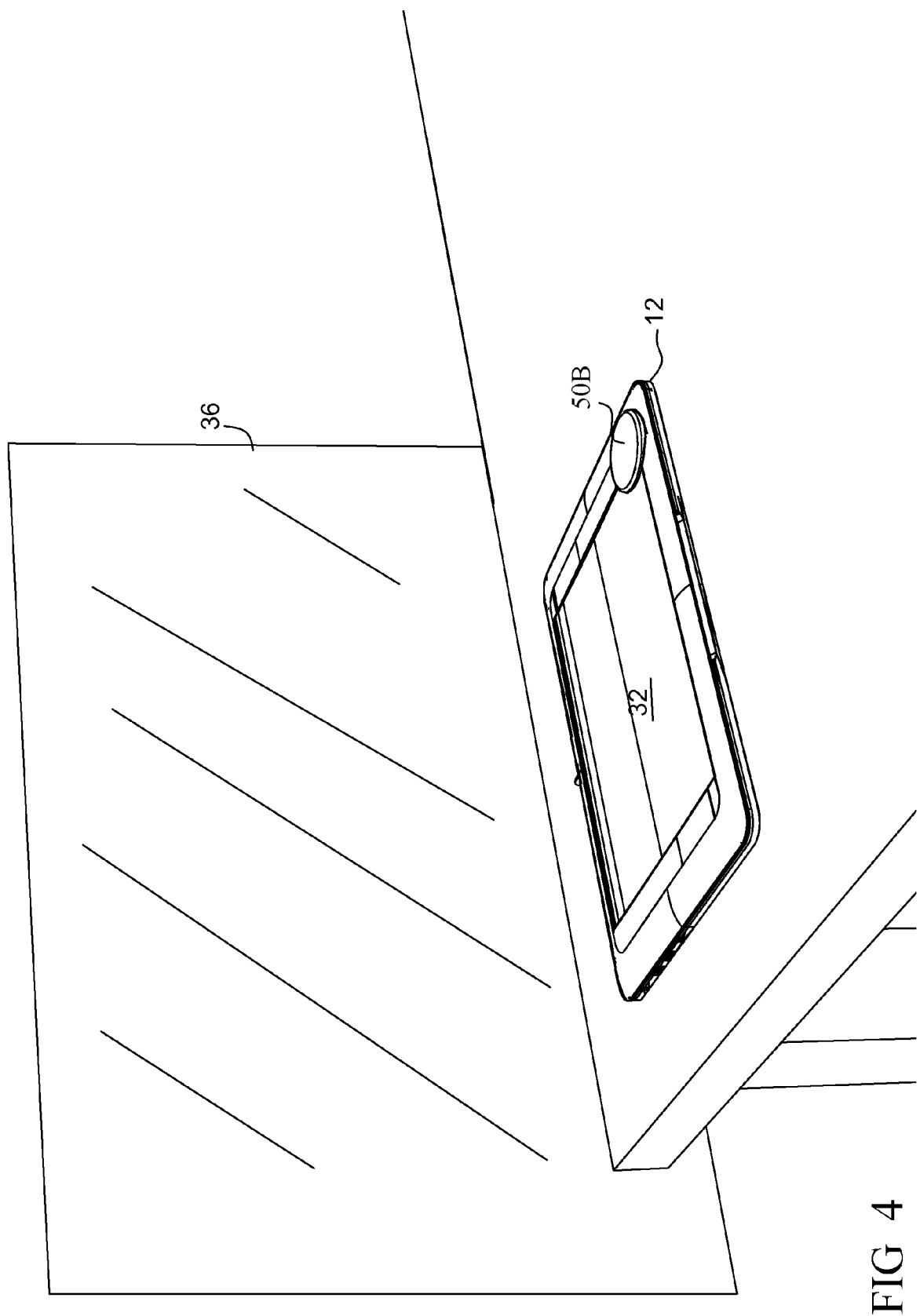
FIG. 4 depicts the mobile computer of FIG. 3 at the folded state.

FIG. 1 depicts a prior art mobile computer.

Liquid Crystal Display (LCD) 31 constitutes a plurality of cells, each receiving an electronic input 62, which changes the cell's optical transparency.

A prior art mobile computer 60 includes a prior art monitor 32 including an illumination source 50A disposed behind LCD 31, producing together a picture to be viewed by a user 54.

FIG. 2 depicts a prior art projector.

A prior art projector 56A includes a small and strong illumination source 50B disposed behind a small LCD 31; and a lens 34, for projecting a picture onto a projection screen 36.

FIG. 3 depicts a mobile computer according to one embodiment of the invention.

A mobile computer 10 according to one embodiment of the invention includes monitor 32 including illumination source 50A disposed behind LCD 31; and a strong illumination source 50B disposed behind a limited area 38 (shown in FIG. 5) of LCD 31 for illuminating thereof.

FIG. 4 depicts the mobile computer of FIG. 3 at the folded state.

Figure 5:
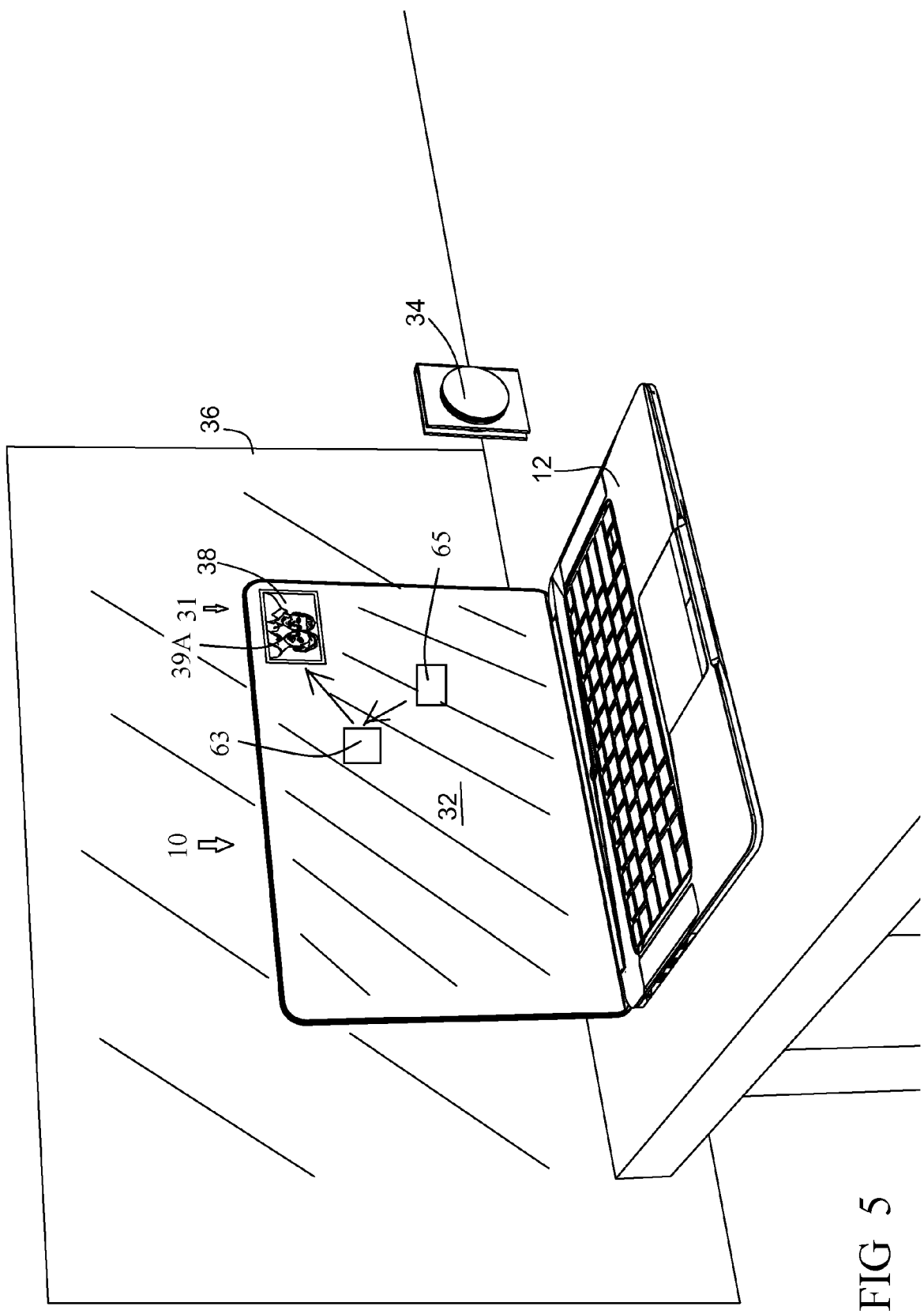
FIG. 5 depicts the mobile computer of FIG. 3 upon unfolding it and executing an application.

FIG. 5 depicts the mobile computer of FIG. 3 upon unfolding it and executing an application.

The user executes an application 63, for making LCD 31 produce a inverted display 39A of a file 65 at area 38, and for turning on strong illumination source 50B (shown in FIG. 4).

Figure 6:
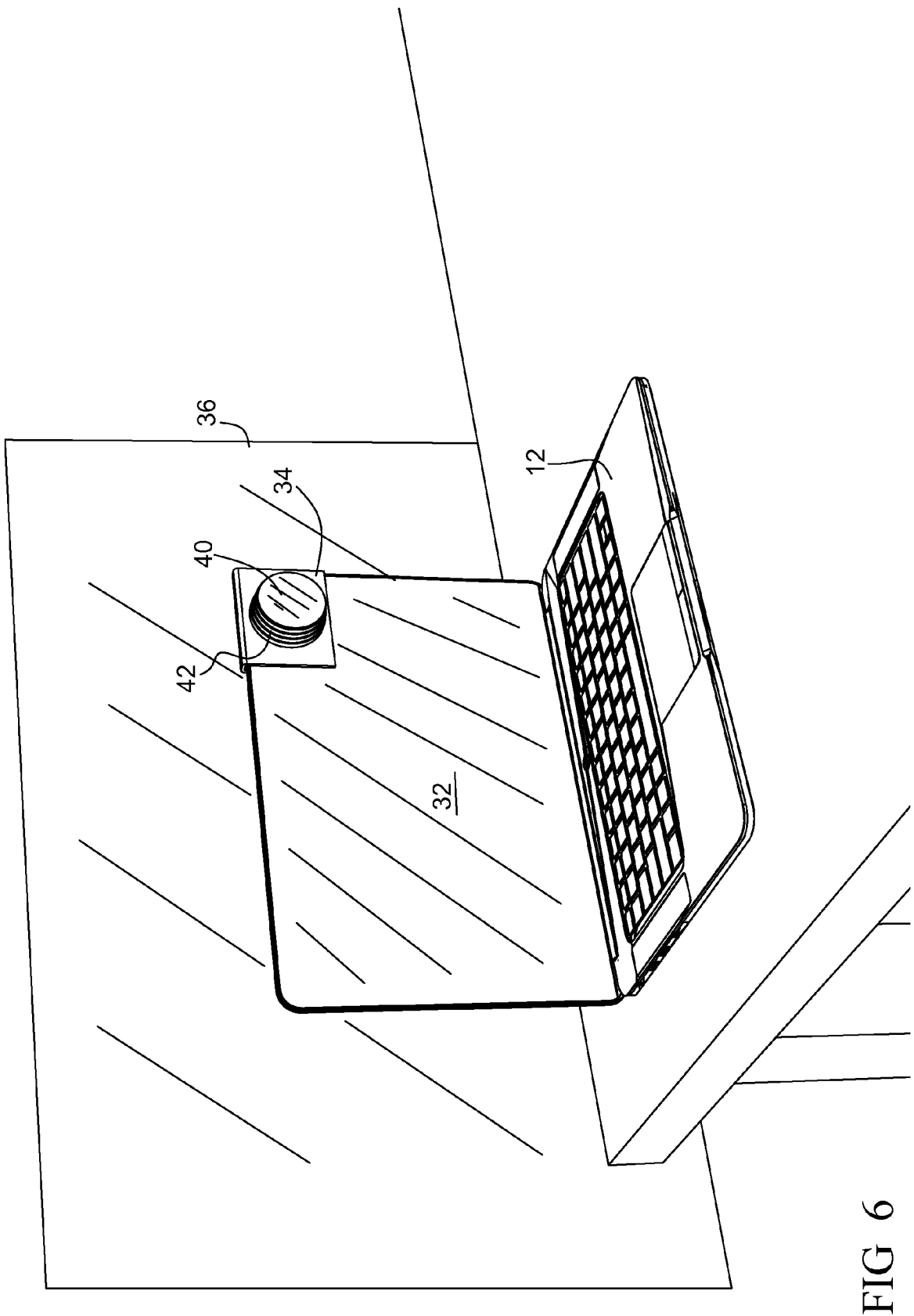
FIG. 6 depicts the mobile computer of FIG. 5 upon assembling a lens.

FIG. 6 depicts the mobile computer of FIG. 5 upon assembling a lens.

The user then assembles a lens 34 on area 38 of FIG. 5.

Figure 7:
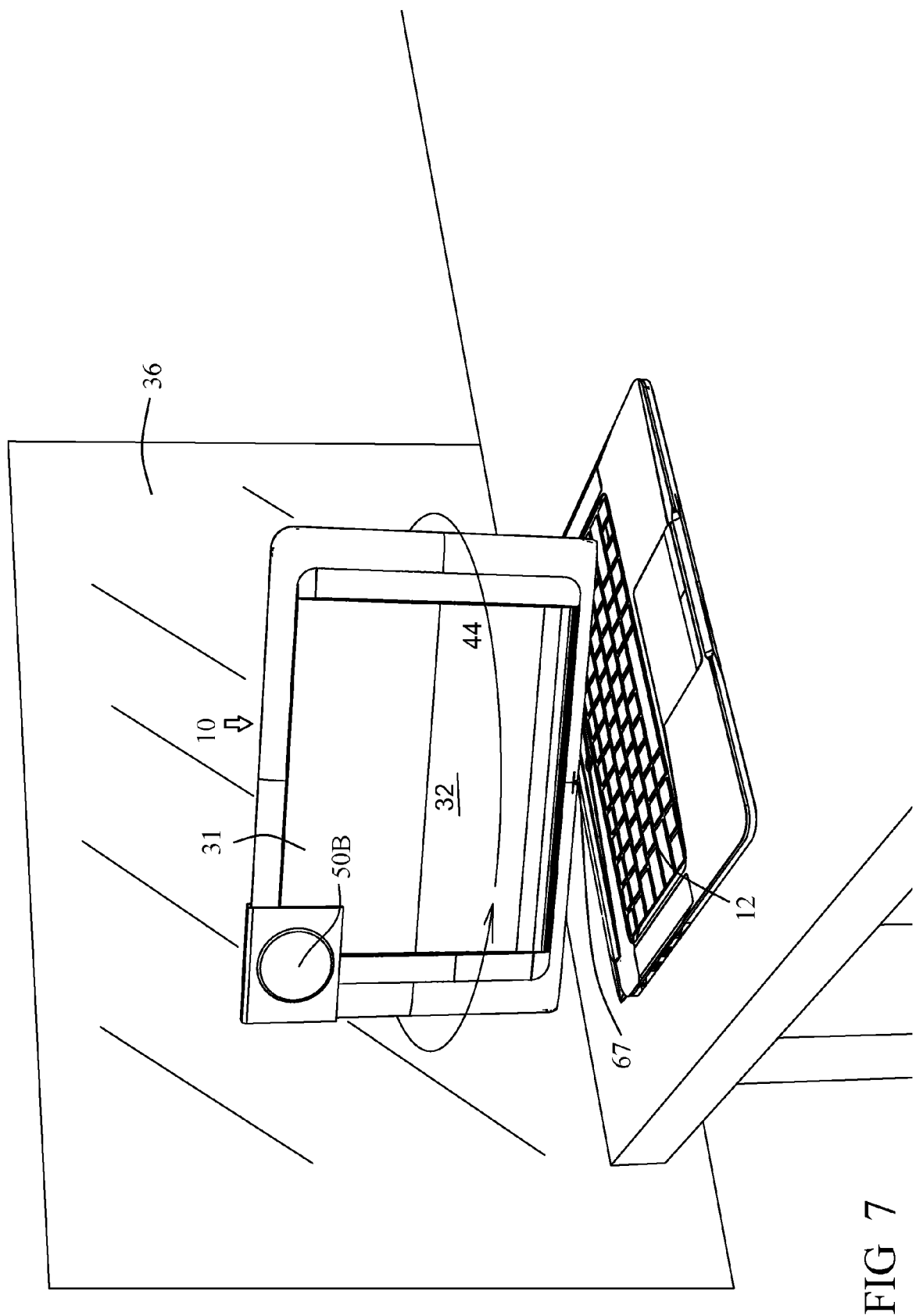
FIG. 7 depicts the mobile computer of FIG. 5 upon rotating the monitor.

FIG. 7 depicts the mobile computer of FIG. 5 upon rotating the monitor.

The user then rotates (44) monitor 32 of mobile computer 10 in relation to keyboard 12 about a hinge 67.

Figure 8:
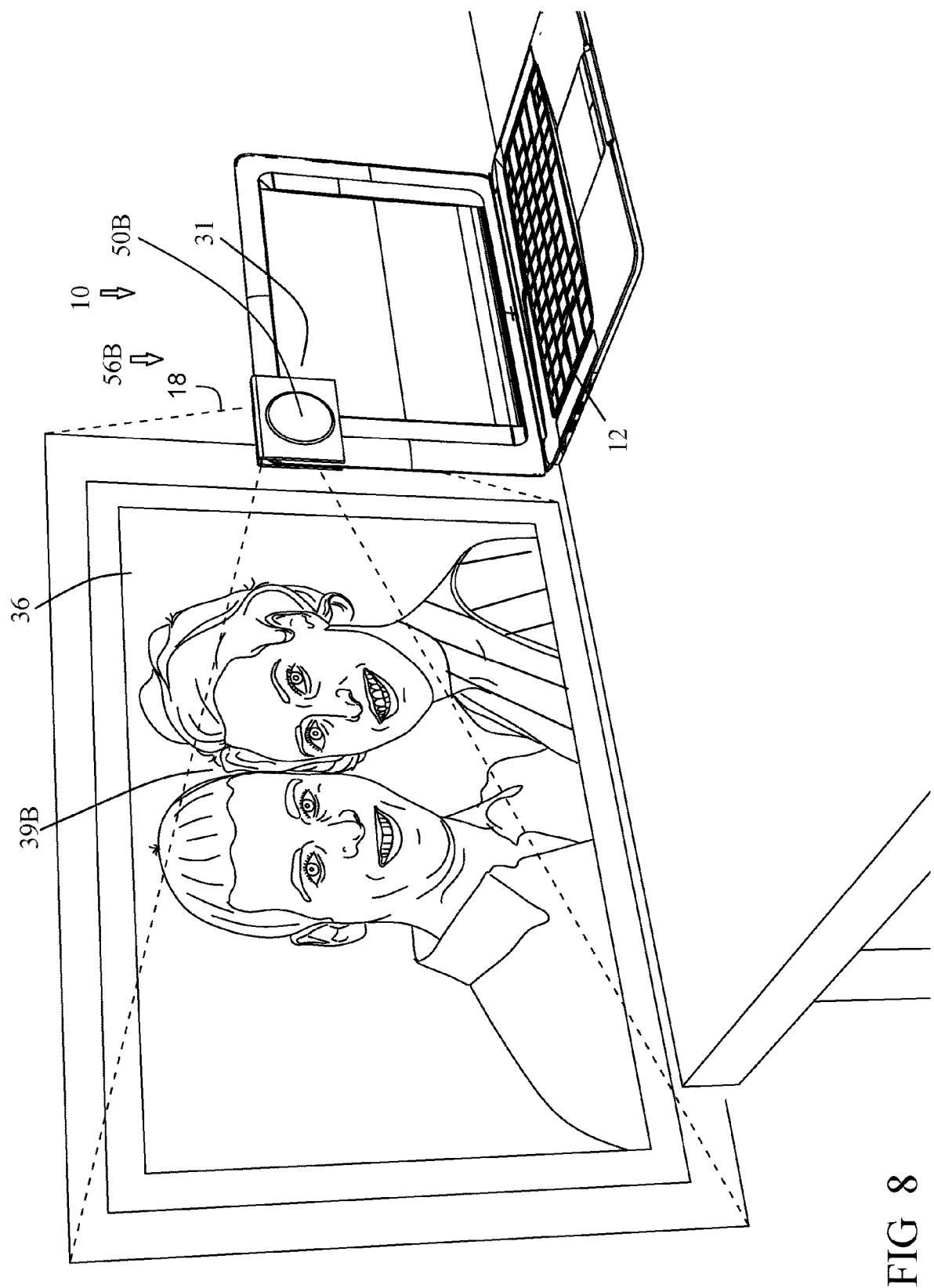
FIG. 8 depicts the mobile computer of FIG. 5 functioning as a projector.

FIG. 8 depicts the mobile computer of FIG. 5 functioning as a projector.

Thus, illumination source 50B is directed to illuminate (18) towards projection screen 36 through LCD 31 and further through lens 34 of FIG. 6, which inverts back the inverted image, focuses and enlarges display 39A to display (39B) on projection screen 36, thus mobile computer 10 functions as a projector 56B.

The user may use keyboard 12 and view the enlarged picture of projection screen 36.

Thus, in one aspect, the invention is directed to a mobile computer (10), including:
- a liquid crystal display (31);
- a first illumination source (50A), disposed behind the liquid crystal display (31) for allowing illuminating through the entire of the liquid crystal display (31);
- a second illumination source (50B), disposed behind the liquid crystal display (31), for allowing illuminating through a portion (38) of the liquid crystal display (31) stronger than the illuminating by the first illumination source (50A); and
- a lens (34), for allowing disposing it on the portion (38) of the liquid crystal display (31), thereby the mobile computer (10) includes a monitor (32) including the first illumination source (50A) and the entire of the liquid crystal display (31), and further includes a projector (56B) including the second illumination source (50B) and the lens (34) and the portion (38) of the liquid crystal display (31).

The mobile computer (10) may further include an application (63), for controlling the portion (38) of the liquid crystal display (31) to display information (65) for being projected.

The application (63) may be configured to control the liquid crystal display (31) to display the information (65) of the portion (38) inverted, for being inverted back by the lens (34), thereby to cancel the inverting by the lens (34).

The portion (38) of the liquid crystal display (31) may be disposed at the top of the liquid crystal display (31), thereby the disposition of the lens (34) is on the top.

The liquid crystal display (31) may be configured to allow displaying towards the keyboard (12) of the mobile computer (10) and backwards therefrom.

The liquid crystal display (31) may include a hinge (67) for rotating thereof horizontally in relation to a keyboard (12) of the mobile computer (10).

In the figures and/or description herein, the following reference numerals (Reference Signs List) have been mentioned:

- 10: denotes the mobile computer according to one embodiment;
- 12: keyboard of mobile computer;
- 18: illumination through and after LCD 31;
- 31: liquid crystal display (LCD);
- 32: monitor;
- 34: lens;
- 36: projection screen;
- 38: portion of liquid crystal display 31;
- 39A: display of portion 38;
- 39B: display on projection screen 36;

40: lens element of lens 34;
42: expandable ring, for expanding lens 34;
44: rotation of monitor 32 in relation to keyboard 12;
50A: illumination source of monitor 32;
50B: strong and small illumination source;
54: user's eye;
60: prior art mobile computer;
62: electronic input being information to be displayed;
63: application;
65: electronic information, such as a file;
67: hinge;
72: package.

The reference numbers in the claims should not be interpreted as limiting the claims in any form.

What is claimed is:

1. A mobile computer, comprising:
   a liquid crystal display;
   a first illumination source, disposed behind said liquid crystal display for allowing illuminating through an entire of said liquid crystal display;
   a second illumination source, disposed behind said liquid crystal display, for allowing illuminating through a portion of said liquid crystal display stronger than said illuminating by said first illumination source, wherein said portion of said liquid crystal display is smaller than said entire of said liquid crystal display; and
   a lens, for allowing disposing said lens only on said portion of said liquid crystal display for projecting only said portion of said liquid crystal display onto a projection screen,
   thereby said mobile computer comprises a monitor comprising said first illumination source and said entire of said liquid crystal display illuminated thereby, wherein said entire of said liquid crystal display except of said portion thereof, is not illuminated by said second illumination source and is not projected by said lens, and
   thereby said mobile computer functions as a projector comprising said second illumination source and said lens and said portion of said liquid crystal display projected by said lens, wherein said second illumination source illuminates only said portion of said liquid crystal display.

2. The mobile computer according to claim 1, further comprising:
   an application, for controlling said portion of said liquid crystal display to display information for being projected.

3. The mobile computer according to claim 2, wherein said application is configured to control said liquid crystal display to display said information of said portion only inverted, for being inverted back by said lens, thereby to cancel said inverting by said lens.

4. The mobile computer according to claim 1, wherein said portion of said liquid crystal display is disposed at a top of said liquid crystal display, thereby said disposition of said lens is on said top.

5. The mobile computer according to claim 1, wherein said liquid crystal display is configured to allow displaying towards a keyboard of said mobile computer and backwards therefrom by rotating said liquid crystal display horizontally in relation to the keyboard.

* * * * *